United States Patent
Miljavec et al.

(10) Patent No.: US 11,223,222 B2
(45) Date of Patent: Jan. 11, 2022

(54) CONTACTLESS CHARGING APPARATUS AND METHOD FOR CONTACTLESS CHARGING

(71) Applicant: Texas Institute of Science, Inc., Richardson, TX (US)

(72) Inventors: Damijan Miljavec, Ljubljana (SI); Mario Vukotic, Ljubljana (SI); Selma Corovic, Ljubljana (SI); Laslo Olah, Richardson, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 0 days.

(21) Appl. No.: 16/986,736

(22) Filed: Aug. 6, 2020

(65) Prior Publication Data

US 2021/0083502 A1    Mar. 18, 2021

Related U.S. Application Data

(60) Provisional application No. 62/967,954, filed on Jan. 30, 2020, provisional application No. 62/899,820, filed on Sep. 13, 2019.

(51) Int. Cl.
  *H02J 7/02*      (2016.01)
  *H02J 50/10*     (2016.01)
  *H01F 38/14*     (2006.01)

(52) U.S. Cl.
  CPC .............. *H02J 7/02* (2013.01); *H01F 38/14* (2013.01); *H02J 50/10* (2016.02)

(58) Field of Classification Search
  CPC . H02J 7/02; H02J 50/10; H02J 50/005; H01F 38/14; H01F 3/10
  USPC .......................................... 320/108; 307/104
  See application file for complete search history.

(56) References Cited

U.S. PATENT DOCUMENTS

| | | |
|---|---|---|
| 3,801,022 A | 4/1974 | Cassey |
| 4,675,638 A | 6/1987 | Szabo |
| 6,526,293 B1 | 2/2003 | Matsuo |
| 7,443,057 B2 | 10/2008 | Nunally |
| 7,705,565 B2 | 4/2010 | Patino et al. |
| 8,427,012 B2 | 4/2013 | Azancot |

(Continued)

OTHER PUBLICATIONS

International Search Report Re: PCT/US20/50362 from WIPO dated Nov. 12, 2020.

*Primary Examiner* — Richard V Muralidar
(74) *Attorney, Agent, or Firm* — Scott Griggs; Griggs Bergen LLP

(57) ABSTRACT

A contactless charging apparatus and method for contactless charging are disclosed. In one embodiment of the contactless charging apparatus, a primary electromagnetic structure and a secondary electromagnetic structure are disposed in an opposing relationship with primary concentric cores of the primary electromagnetic structure facing secondary concentric cores of the secondary electromagnetic structure with a non-magnetic gap therebetween. Coils may be positioned in the annular spaces between the primary and the secondary concentric cores. A non-resonance circuit is formed between the primary electromagnetic structure and the secondary electromagnetic structure to provide a contactless electrical energy transmission from the primary electromagnetic structure to the secondary electromagnetic structure with the use of a time-varying electromagnetic field.

11 Claims, 2 Drawing Sheets

(56) References Cited

U.S. PATENT DOCUMENTS

| | | | |
|---|---|---|---|
| 8,796,989 B2* | 8/2014 | Lee | H02J 50/402 |
| | | | 320/108 |
| 9,190,849 B2 | 11/2015 | Won et al. | |
| 9,390,851 B2* | 7/2016 | Suzuki | H01F 27/2871 |
| 9,460,846 B2* | 10/2016 | Graham | H01F 27/28 |
| 9,466,420 B2* | 10/2016 | Van Gils | H04B 5/0075 |
| 9,796,280 B2 | 10/2017 | McCool et al. | |
| 2006/0113955 A1 | 6/2006 | Nunally | |
| 2007/0178945 A1 | 8/2007 | Cook et al. | |
| 2008/0014897 A1 | 1/2008 | Cook et al. | |
| 2012/0319647 A1 | 12/2012 | Itabashi et al. | |
| 2014/0055089 A1* | 2/2014 | Ichikawa | B60L 53/38 |
| | | | 320/108 |
| 2016/0027576 A1 | 1/2016 | Stein et al. | |
| 2017/0093213 A1* | 3/2017 | Iwase | H02J 50/90 |
| 2018/0091000 A1* | 3/2018 | Jol | H02J 50/70 |

* cited by examiner

CONTACTLESS CHARGING APPARATUS AND METHOD FOR CONTACTLESS CHARGING

PRIORITY STATEMENT & CROSS-REFERENCE TO RELATED APPLICATIONS

This application claims priority from (1) U.S. Provisional Patent Application No. 62/899,820 entitled "Contactless Charging Apparatus and Method for Contactless Charging" and filed on Sep. 13, 2019 in the names of Damijan Miljavec et al.; and (2) U.S. Provisional Patent Application No. 62/967,954 entitled "Contactless Charging Apparatus and Method for Contactless Charging" and filed on Jan. 30, 2020 in the names of Damijan Miljavec et al.; both of which are hereby incorporated by reference, in entirety, for all purposes.

TECHNICAL FIELD OF THE INVENTION

This invention relates, in general, to electrical energy transmission, and, in particular, to a contactless charging apparatus and method for contactless charging for the transmission of electrical energy to supply power to a battery of an electronic device, for example.

BACKGROUND OF THE INVENTION

The transmission of electrical energy between two electric devices is usually accomplished by using electrically conductive or galvanic contacts, such as a cable with plugs. Plug contact surfaces with different electric potentials, such as different phases of an AC supply or positive and negative terminals of a DC supply are electrically insulated from each other and sometimes also from the surroundings. If the surrounding medium is electrically non-conductive, as with air, the operation is safe and reliable, provided that the safety measures defined in standards and other technical documents are employed.

In some cases, using a cable with plugs for electrical energy transmission might be impractical, unsuitable or even impossible. Such examples, where avoiding a cable with plugs for energy transmission would be reasonable, include but are not limited to wireless mobile phone charging, wireless charging of the battery in the hybrid or battery electric vehicle, underwater operation, and operation in highly explosive areas, for example. In such cases, a different approach has to be implemented, i.e. contactless electrical energy transmission. The term "contactless" refers to the non-existence of electric or galvanic contact in this case.

The most popular contactless or wireless electric energy transmission systems use electromagnetic induction for the energy transfer from the source to the load through air or other medium and are often referred to as "inductive transmission systems". The primary coil on the source side generates time varying magnetic field, which is then captured by the secondary coil. Depending on the amount of the captured magnetic field and the intensity of its variation in time, different voltage can be induced in the secondary coil. This voltage then drives the current through the load. Inductive transmission systems, which are currently used, have relatively large distances between the primary and secondary and employ partially or fully air coils. This leads to a magnetic circuit with large reluctance which demands high magnetizing current and/or high frequency operation for the sufficient amount of energy to be transferred in a reasonable time. High frequency also limits the range of the materials that could be used in such device. To reduce the amount of magnetizing current from the source, a resonant electric circuit is often utilized. As a result, there is a continuing need for improved design for wireless electric energy transmission systems.

SUMMARY OF THE INVENTION

It would be advantageous to achieve a contactless charging apparatus and method for using that same for providing wireless electric energy transmission that would improve upon existing limitations in stability and functionality. It would also be desirable to enable an electromagnetic and mechanical solution with minimal reluctance while transmitting a sufficient amount of energy in a reasonable time. Therefore, a contactless charging apparatus and method for contactless charging are disclosed. In one embodiment of the contactless charging apparatus, a primary electromagnetic structure and a secondary electromagnetic structure are disposed in an opposing relationship to face each other with primary concentric cores of the primary electromagnetic structure facing secondary concentric cores of the secondary electromagnetic structure with a non-magnetic gap therebetween. Coils may be positioned in the annular spaces between the primary and secondary concentric cores. A non-resonance circuit is formed between the primary electromagnetic structure and the secondary electromagnetic structure to provide contactless electrical energy transmission from the primary electromagnetic structure to the secondary electromagnetic structure with the use of a time-varying electromagnetic field. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
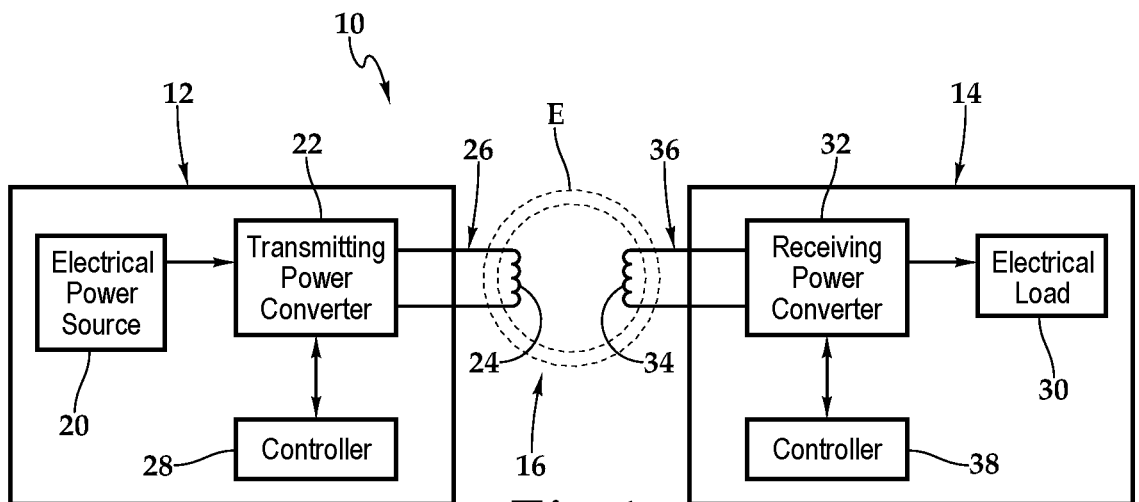
FIG. 1 is a functional block diagram of one embodiment of a contactless charging apparatus, according to the teachings presented herein.
Figure 2:
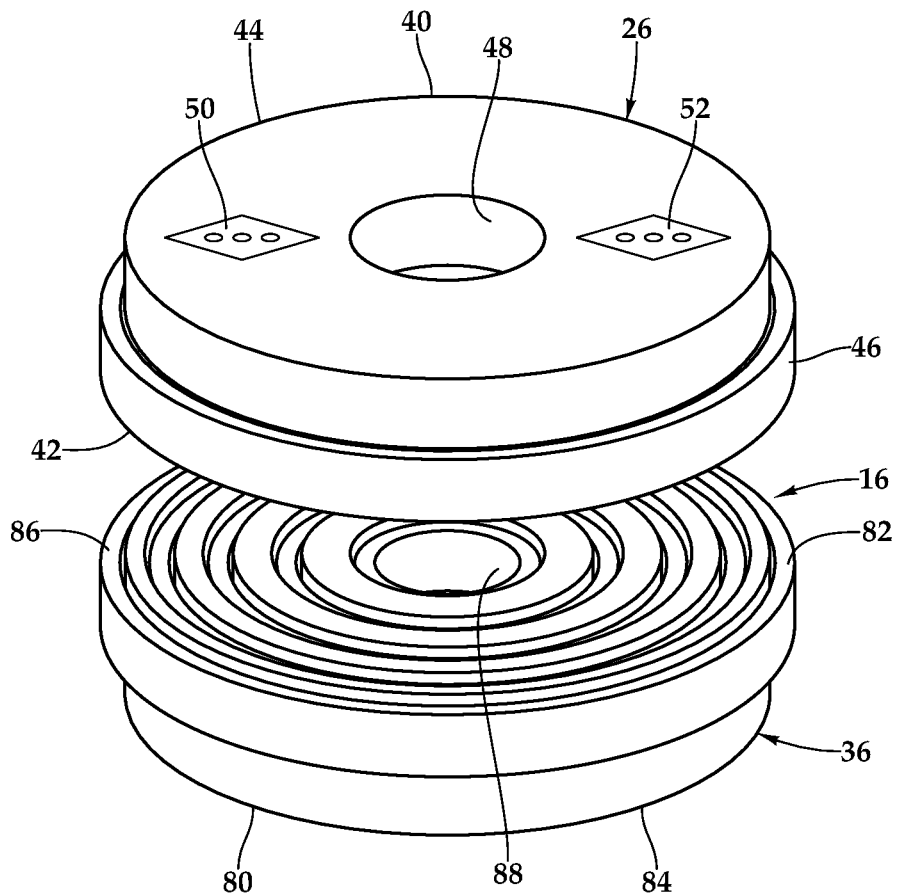
FIG. 2 is a front perspective view of one embodiment of a primary electromagnetic structure and a secondary electromagnetic structure, which form a portion of the contactless charging apparatus depicted in FIG. 1.
Figure 3:
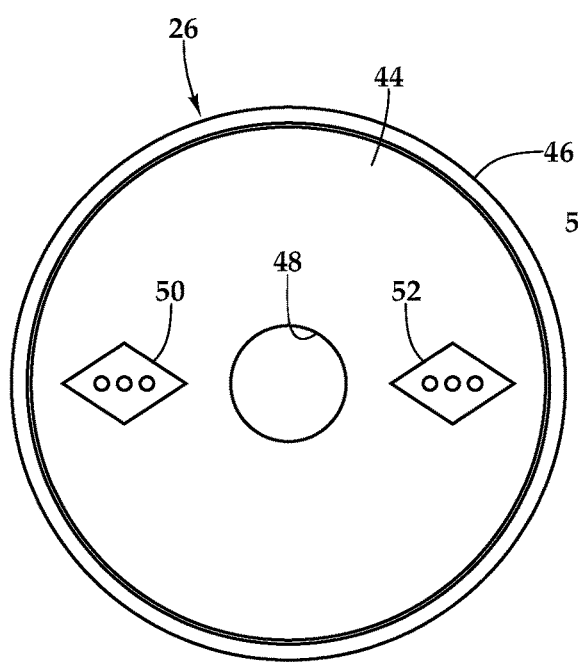
FIG. 3 is an exterior plan view of the primary electromagnetic structure depicted in FIG. 1.
Figure 4:
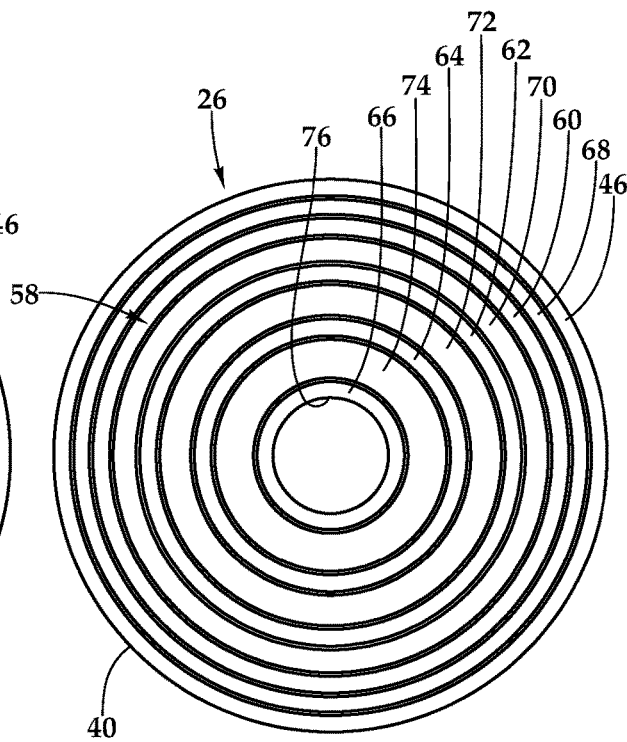
FIG. 4 is an interior plan view of the primary electromagnetic structure depicted in FIG. 1.
Figure 5:
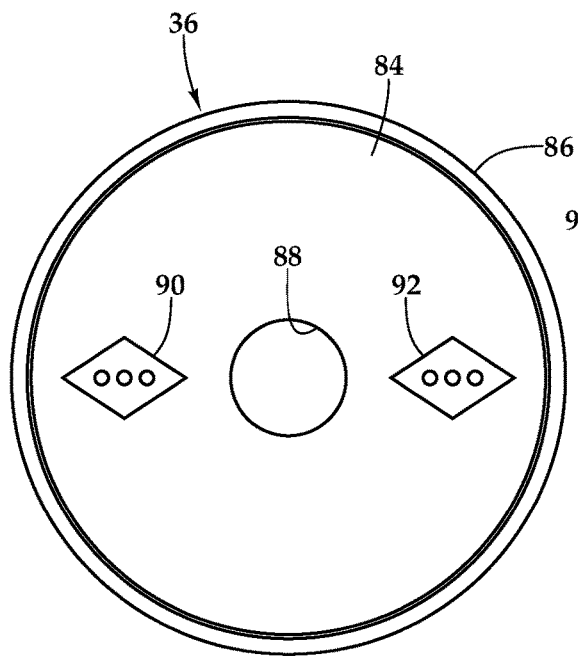
FIG. 5 is an exterior plan view of the secondary electromagnetic structure depicted in FIG. 1.
Figure 6:
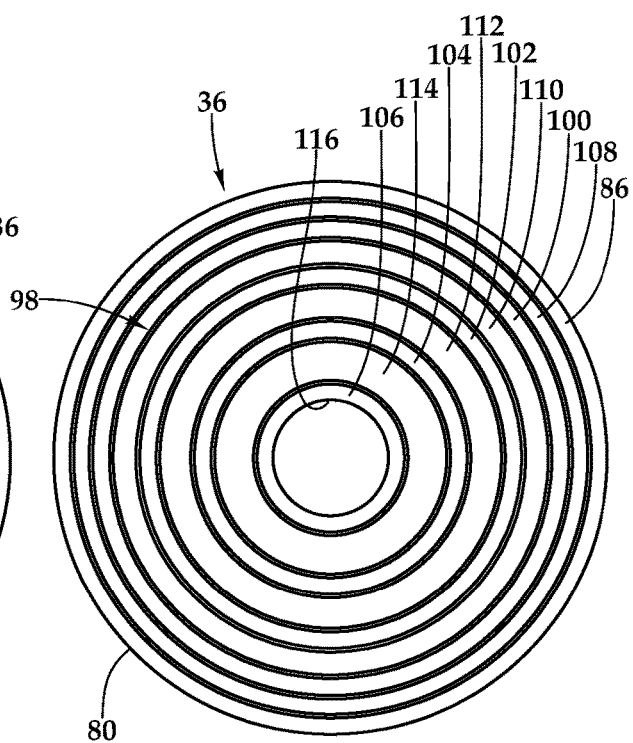
FIG. 6 is an interior plan view of the secondary electromagnetic structure depicted in FIG. 1.

Referring now to FIG. 1, therein is depicted one embodiment of a contactless charging apparatus, which is schematically illustrated and designated 10. A power transmitting structure 12 and a power receiving structure 14 are separated by a non-magnetic gap 16 therebetween. The power transmitting structure 12 includes an electrical power source 20, such as battery, capacitor, or electrical plug and socket, for example, providing a power source for the transmitting power converter 22 having coils 24 within a primary electromagnetic structure 26. As shown, the transmitting power converter 22 is under the control of the controller 28. Similarly, the power receiving structure 14 includes an electrical load 30, such as a battery, providing a load for a receiving power converter 32 having coils 34 within a secondary electromagnetic structure 36. As shown, the receiving power converter 32 is under the control of the controller 38. In operation, power is transferred from the electrical power source to the electrical load 30 via the primary electromagnetic structure 26 and the secondary electromagnetic structure 36 as indicated by energy transmission E.

Referring now to FIG. 2 through FIG. 6, in one embodiment, the primary electromagnetic structure 26 has an upper end 40 and an interior end 42. A primary yoke 44, which may be disc-like form, is located at the upper end 40 and includes, for example, a radial flange 46 extending therefrom toward the interior end 42. An opening 48 is located in the primary yoke 44. Wiring openings 50, 52 provide a connection with the electrical power source 20, the transmitting power converter 22, and controller 28, for example. As shown, primary yoke 44 includes primary concentric cores 58 extending therefrom into the interior end 42 of the primary electromagnetic structure 26. As shown, the primary concentric cores 58 include toroidal cores 60, 62, 64, 66. The primary concentric cores 58 define annular spaces 68, 70, 72, 74 and an inner space 76. The primary yoke 44 functions to magnetically connect all concentric cores 58 and to mechanically hold the concentric cores in a fixed position.

In one embodiment, the secondary electromagnetic structure 36 has a lower end 80 and an interior end 82. A secondary yoke 84 is located at the lower end 80 and includes a radial flange 86 extending therefrom toward the interior end 82. An opening 88 is located in the secondary yoke 84. Wiring openings 90, 92 provide a connection with the electrical load 30, the receiving power converter 32, and controller 38, for example. As shown, the secondary yoke 84 includes secondary concentric cores 98 extending therefrom into the interior end 82 of the secondary electromagnetic structure 36. As shown, the secondary concentric cores 98 include toroidal cores 100, 102, 104, 106. The secondary concentric cores 98 define annular spaces 108, 110, 112, 114 and an inner space 116. As will be appreciated, in one embodiment, the primary electromagnetic structure 26 and the secondary electromagnetic structure 36 are symmetrical.

In one embodiment, each of the primary yoke 44 and the secondary yoke 84 include a magnetic material, including soft-magnetic materials such as, for example, ferromagnetic materials. In particular, each of the primary yoke 44 and the secondary yoke 84 include a soft-magnetic material, such as annealed iron, for example. Such soft-magnetic materials may stay magnetized but the magnetization may be easily annihilated after the magnetic field is removed. Further, it should be appreciated that the primary electromagnetic structure and the secondary electromagnetic structure may be geometrically inverted such that the primary yoke is located at a lower end of the primary electromagnetic structure and the secondary yoke is located at the upper end of the secondary electromagnetic structure. Each of the primary concentric cores 58 and the secondary concentric cores 98 may be axisymmetric and composed of concentric cores with arbitrary cross-sections. Also, each of the primary concentric cores 58 may also comprise a soft-magnetic material and, in one implementation, a ferromagnetic material. Each of the primary concentric cores 58 and the secondary concentric cores 98 may include a distinct radial cross-section that may be arbitrary, such as an arbitrary polygon. As a result, in one embodiment, the annular spaces 68, 70, 72, 74 of the primary electromagnetic structure 26 and the annular spaces 108, 110, 112, 114 of the secondary electromagnetic structure 36 may also each include a distinct radial cross-section that may be arbitrary, such as an arbitrary polygon. As shown, N primary concentric cores 58 and N secondary concentric cores 98 are present with N+1 spaces for each of the primary electromagnetic structure 26 and the secondary electromagnetic structure 36; namely, the annular spaces 68, 70, 72, 74 and the inner space 76 of the primary electromagnetic structure 26 and the annular spaces 108, 110, 112, 114 and the inner space 116 of the secondary electromagnetic structure 36. Coils or winding coils may be inserted into the annular spaces 108, 110, 112, 114. It should be appreciated that although a particular number and configuration of primary concentric cores and secondary concentric cores are illustrated, any number or primary concentric cores and secondary concentric cores may be utilized and be within the teachings presented herein.

In one embodiment, the primary electromagnetic structure 26 and the secondary electromagnetic structure 36 are disposed in an opposing relationship with the primary concentric cores 58 facing the secondary concentric cores 98 with the non-magnetic gap 16 therebetween. With this arrangement, contactless electrical energy transmission from the primary electromagnetic structure 26 to the secondary electromagnetic structure 36 may be achieved employing a closed magnetic circuit, apart from the non-magnetic gap 16 between the primary electromagnetic structure 26 and the secondary electromagnetic structure 36, without the use of resonant electric circuit and with reasonably low supply frequency, such as a frequency below 5 kHz. In this arrangement, as discussed, the primary electromagnetic structure 26 transmits the electrical energy from the source to the secondary electromagnetic structure 36. In one embodiment, a time-varying electromagnetic field is implemented by the transmitting power converter 22 and the receiving power converter 32 respectfully under the control of controllers 28, 38 to achieve this transmission. In another embodiment, electromagnetic induction is utilized for delivery of energy from the source, such as the electrical power source 20, to the electrical load 30. The electromagnetic induction may include a time-varying electromagnetic field.

In another implementation, contactless electrical energy transmission includes supplying of the primary electromagnetic structure 26 with a fixed voltage and frequency or by controlling either voltage or frequency or both, where in the case of fixed voltage and frequency, the transmitting power depends on the electrical properties of the load, and in the case of variable voltage and/or frequency, the transmitting power can be controlled from the primary electromagnetic structure 26, for example, with a voltage-frequency (V/f) control method, assuming unchanged geometric relations, i.e. fixed width of non-magnetic gap between the primary electromagnetic structure 26 and the secondary electromagnetic structure 36, during the energy transmission in both cases. By way of example, electrical energy may flow from the primary electromagnetic structure 26 to the secondary electromagnetic structure 36. In many of these embodiments, contactless electrical energy transmission is achieved with arbitrary axial and circumferential position between the primary electromagnetic structure 26 and the secondary electromagnetic structure 36, when electrical energy is transmitted therethrough.

The order of execution or performance of the methods and operations illustrated and described herein is not essential, unless otherwise specified. That is, elements of the methods and flows may be performed in any order, unless otherwise specified, and that the methods may include more or less elements than those disclosed herein. For example, it is contemplated that executing or performing a particular step before, contemporaneously with, or after another step are all possible sequences of execution.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A contactless charging apparatus comprising:
a primary electromagnetic structure having an upper end and an interior end, the primary electromagnetic structure including a primary yoke at the upper end, the primary yoke having a plurality of primary concentric cores extending therefrom into the interior end of the primary electromagnetic structure, the primary yoke magnetically connecting the primary concentric cores;
the plurality of primary concentric cores defining an inner space and a respective plurality of first annular spaces;
each of the plurality of primary concentric cores including a distinct radial cross-section;
each of the plurality of first annular spaces including a distinct radial cross-section;
a secondary electromagnetic structure having a lower end and an interior end, the secondary electromagnetic structure including a secondary yoke at the lower end, the secondary yoke having a plurality of secondary concentric cores extending therefrom into the interior end of the secondary electromagnetic structure, the secondary yoke magnetically connecting the secondary concentric cores;
the plurality of secondary concentric cores defining an inner space and a respective plurality of second annular spaces;
each of the primary yoke and the secondary yoke including a soft-magnetic material;
each of the plurality of primary concentric cores and the plurality of secondary concentric cores including the soft-magnetic material;
the primary electromagnetic structure and the secondary electromagnetic structure being disposed in an opposing relationship with the plurality of primary concentric cores facing the plurality of secondary concentric cores with a non-magnetic gap therebetween;
a plurality of first coils being inserted into the plurality of first annular spaces;
a plurality of second coils being inserted into the plurality of second annular spaces; and
the plurality of first coils and the plurality of second coils being electrically and magnetically coupled in a common electrical and magnetic circuit, thereby forming a polyphase electromagnetic system.

2. The contactless charging apparatus as recited in claim 1, wherein the primary electromagnetic structure and the secondary electromagnetic structure are symmetrical.

3. The contactless charging apparatus as recited in claim 1, wherein the primary electromagnetic structure and the secondary electromagnetic structure form a non-resonance circuit.

4. The contactless charging apparatus as recited in claim 1, wherein each of the plurality of primary concentric cores further comprises a toroidal core.

5. The contactless charging apparatus as recited in claim 1, wherein the primary electromagnetic structure is coupled to a power source.

6. The contactless charging apparatus as recited in claim 1, wherein the secondary electromagnetic structure is coupled to a load.

7. The contactless charging apparatus as recited in claim 1, wherein an electrical energy flows from the primary electromagnetic structure to the secondary electromagnetic structure.

8. The contactless charging apparatus as recited in claim 1, wherein the primary electromagnetic structure and the secondary electromagnetic structure are geometrically inverted such that the primary yoke is located at the lower end of the primary electromagnetic structure and the secondary yoke is located at the upper end of the secondary electromagnetic structure.

9. A contactless charging apparatus comprising:
a primary electromagnetic structure having an upper end and an interior end, the primary electromagnetic structure including a primary yoke at the upper end, the primary yoke having a plurality of primary concentric cores extending therefrom into the interior end of the primary electromagnetic structure;
the plurality of primary concentric cores defining an inner space and a respective plurality of first annular spaces, each of the plurality of primary concentric cores including a distinct radial cross-section, each of the plurality of first annular spaces including a distinct radial cross-section;
a secondary electromagnetic structure having a lower end and an interior end, the secondary electromagnetic structure including a secondary yoke at the lower end, the secondary yoke having a plurality of secondary concentric cores extending therefrom into the interior end of the secondary electromagnetic structure;
the plurality of secondary concentric cores defining an inner space and a respective plurality of second annular spaces;
each of the primary yoke and the secondary yoke including a soft-magnetic material;
each of the plurality of primary concentric cores and the plurality of secondary concentric cores including the soft-magnetic material;
the primary electromagnetic structure and the secondary electromagnetic structure being disposed in an opposing relationship with the plurality of primary concentric cores facing the plurality of secondary concentric cores with a non-magnetic gap therebetween;
the primary electromagnetic structure and the secondary electromagnetic structure form a non-resonance circuit that transmits electrical energy from a source coupled to the primary electromagnetic structure to a load coupled to the secondary electromagnetic structure utilizing an electromagnetic induction;

a plurality of first coils being inserted into the plurality of first annular spaces;

a plurality of second coils being inserted into the plurality of second annular spaces; and the plurality of first coils and the plurality of second coils being electrically and magnetically coupled in a common electrical and magnetic circuit, thereby forming a polyphase electromagnetic system.

10. The contactless charging apparatus as recited in claim 9, wherein the electromagnetic induction further comprises a time-varying electromagnetic field.

11. A contactless charging apparatus comprising:

a primary electromagnetic structure having an upper end and an interior end, the primary electromagnetic structure including a primary yoke at the upper end, the primary yoke having a plurality of primary concentric cores extending therefrom into the interior end of the primary electromagnetic structure;

the plurality of primary concentric cores defining an inner space and a respective plurality of first annular spaces, each of the plurality of primary concentric cores including a distinct radial cross-section, each of the plurality of first annular spaces including a distinct radial cross-section;

a secondary electromagnetic structure having a lower end and an interior end, the secondary electromagnetic structure including a secondary yoke at the lower end, the secondary yoke having a plurality of secondary concentric cores extending therefrom into the interior end of the secondary electromagnetic structure;

the plurality of secondary concentric cores defining an inner space and a respective plurality of second annular spaces;

each of the primary yoke and the secondary yoke including a soft-magnetic material;

each of the plurality of primary concentric cores and the plurality of secondary concentric cores including a soft-magnetic material;

the primary electromagnetic structure and the secondary electromagnetic structure being disposed in an opposing relationship with the plurality of primary concentric cores facing the plurality of secondary concentric cores with a non-magnetic gap therebetween;

the primary electromagnetic structure and the secondary electromagnetic structure form a non-resonance circuit that transmits an electrical energy from a source coupled to the primary electromagnetic structure to a load coupled to the secondary electromagnetic structure utilizing a time-varying electromagnetic field;

a plurality of first coils being inserted into the plurality of first annular spaces;

a plurality of second coils being inserted into the plurality of second annular spaces; and the plurality of first coils and the plurality of second coils being electrically and magnetically coupled in a common electrical and magnetic circuit, thereby forming a polyphase electromagnetic system.

* * * * *